United States Patent
Han et al.

(10) Patent No.: US 12,383,990 B2
(45) Date of Patent: Aug. 12, 2025

(54) FLUX-CORED WIRE

(71) Applicant: Kobe Steel, Ltd., Kobe (JP)

(72) Inventors: Peng Han, Fujisawa (JP); Masamichi Suzuki, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 421 days.

(21) Appl. No.: 18/005,452

(22) PCT Filed: Sep. 3, 2021

(86) PCT No.: PCT/JP2021/032558
§ 371 (c)(1),
(2) Date: Jan. 13, 2023

(87) PCT Pub. No.: WO2022/050400
PCT Pub. Date: Mar. 10, 2022

(65) Prior Publication Data
US 2023/0271277 A1    Aug. 31, 2023

(30) Foreign Application Priority Data

Sep. 7, 2020  (JP) ................. 2020-150048

(51) Int. Cl.
| | | |
|---|---|---|
| B23K 35/30 | (2006.01) | |
| B23K 35/02 | (2006.01) | |
| B23K 35/36 | (2006.01) | |
| B23K 35/362 | (2006.01) | |
| C22C 38/00 | (2006.01) | |
| C22C 38/02 | (2006.01) | |
| C22C 38/04 | (2006.01) | |
| C22C 38/44 | (2006.01) | |
| C22C 38/50 | (2006.01) | |

(52) U.S. Cl.
CPC ...... *B23K 35/3086* (2013.01); *B23K 35/0266* (2013.01); *B23K 35/3605* (2013.01); *B23K 35/362* (2013.01); *C22C 38/002* (2013.01); *C22C 38/02* (2013.01); *C22C 38/04* (2013.01); *C22C 38/44* (2013.01); *C22C 38/50* (2013.01)

(58) Field of Classification Search
CPC ............ B23K 35/3086; B23K 35/0266; B23K 35/3605; B23K 35/362; B23K 35/0261; B23K 35/3053; B23K 35/3066; B23K 35/3073; B23K 35/308; B23K 35/3602; B23K 35/30; B23K 35/368; C22C 38/002; C22C 38/02; C22C 38/04; C22C 38/44; C22C 38/50; C22C 38/00; C22C 38/001; C22C 38/48; C22C 38/06; C22C 38/42; C22C 38/58
See application file for complete search history.

(56) References Cited

FOREIGN PATENT DOCUMENTS

| | | |
|---|---|---|
| CN | 106994570 A | 8/2017 |
| JP | 2007-160314 A | 6/2007 |
| JP | 2015-139807 A | 8/2015 |
| JP | 2020-15092 A | 1/2020 |

OTHER PUBLICATIONS

International Search Report issued Nov. 16, 2021 in PCT/JP2021/032558, filed on Sep. 3, 2021, 2 pages.

*Primary Examiner* — Adil A. Siddiqui
(74) *Attorney, Agent, or Firm* — Oblon, McClelland, Maier & Neustadt, L.L.P.

(57) ABSTRACT

A flux-cored wire for arc welding, including a steel sheath filled with flux, where the wire contains, relative to a total mass of the wire, Cr: 16.0 to 22.0 mass %, Ni: 6.0 to 11.0 mass %, Mn: 0.7 to 2.6 mass %, Si: 0.1 to 1.1 mass %, Zr: 0.2 to 0.8 mass %, Fe: 45.0 to 65.0 mass %, $TiO_2$: 5.0 to 9.0 mass %, $SiO_2$: 0.1 to 2.0 mass %, $ZrO_2$: 0.5 to 3.0 mass %, and Bi: less than 0.0020 mass %. Where by mass %, a Si content is denoted by [Si] and a Zr content is denoted by [Zr], a value of parameter A expressed by $A=[Si]+2\times[Zr]$ satisfies 1.4 to 2.5.

5 Claims, No Drawings

FLUX-CORED WIRE

CROSS REFERENCE TO RELATED APPLICATIONS

This application is a National Stage entry under 35 U.S.C. § 371 of PCT/JP2021/032558, filed on Sep. 3, 2021, and claims priority to Japanese Patent Application No. 2020-150048, filed on Sep. 7, 2020. The entire contents of both are incorporated herein by reference.

TECHNICAL FIELD

The present invention relates to a flux-cored wire.

BACKGROUND ART

Studies have been performed on a flux-cored wire that is used for welding high-strength stainless steel, that provides high-strength weld joint performance, the high-strength being similar to that of austenitic stainless steel SUS304, that has high bendability, that has high low-temperature toughness, and that provides high welding usability.

For example, Patent Literature 1 discloses a flux-cored wire for welding high-strength stainless steel in which an austenitic stainless steel sheath is filled with flux, the flux-cored wire containing Ni: 8.0 to 10.0%, Cr: 17.0 to 22.0%, Ti: 0.5 to 2.0%, Bi: 0.10% or less, fluoride: 0.05 to 0.70%, and a total slag-agent content: 5 to 10%, the remainder being a deoxidizer, Fe, and unavoidable impurities, wherein the deoxidizer component causes the weld metal to have an oxygen content of 0.07 to 0.20 mass %. However, in the flux-cored wire disclosed in Patent Literature 1, Bi is added in an amount of 0.01 to 0.10% to the wire, so that the weld metal has poor hot-cracking resistance, poor corrosion resistance, and poor low-temperature toughness.

As a Bi-free flux-cored wire, for example, Patent Literature 2 discloses a flux-cored wire used for welding stainless steel, containing C: 0.005 to 0.10%, Si: 0.1 to 1.0%, Mn: 0.5 to 4.5%, Ni: 7 to 12%, Cr: 18 to 25%, Mo: 0.01 to 1.0%, Ti: 0.1 to 0.5%, N: 0.1 to 0.3%, and Nb: 0.05% or less, and containing, in the flux, $TiO_2$: 4.5 to 7.5%, $SiO_2$: 0.2 to 1.8%, $ZrO_2$: 0.01 to 0.10%, $Al_2O_3$: 0.01 to 0.20%, one or two of a Na compound value in terms of $Na_2O$ and a K compound value in terms of $K_2O$: 0.01 to 0.20%, and a fluorine compound in terms of F: 0.1 to 1.0%, the remainder being Fe and unavoidable impurities.

CITATION LIST

Patent Literature

PTL 1: Japanese Unexamined Patent Application Publication No. 2007-160314
PTL 2: Japanese Unexamined Patent Application Publication No. 2015-139807

SUMMARY OF INVENTION

Technical Problem

However, for the flux-cored wire described in PTL 2, it does not contain Bi and hence has insufficient welding usability such as slag removability in some cases; in particular, for execution of welding for joints of fixed pipes or the like, improvement in welding usability has been in demand.

The present invention has been made under such circumstances and an object is to provide a flux-cored wire used for welding stainless steel and having high welding usability.

Solution to Problem

The inventors of the present invention performed thorough studies on flux-cored wires used for stainless steel and having a restricted Bi content and, as a result, have found that, by adding specific metallic components and controlling their contents, high usability can be achieved.

Specifically, a flux-cored wire according to an embodiment of the present invention is a flux-cored wire for arc welding, including a steel sheath filled with flux,
wherein the wire contains, relative to a total mass of the wire,
Cr: 16.0 to 22.0 mass %,
Ni: 6.0 to 11.0 mass %,
Mn: 0.7 to 2.6 mass %,
Si: 0.1 to 1.1 mass %,
Zr: 0.2 to 0.8 mass %,
Fe: 45.0 to 65.0 mass %,
$TiO_2$: 5.0 to 9.0 mass %,
$SiO_2$: 0.1 to 2.0 mass %, and
$ZrO_2$: 0.5 to 3.0 mass %, and
is restricted to Bi: less than 0.0020 mass % (including 0 mass %), and
when, by mass %, a Si content is denoted by [Si] and a Zr content is denoted by [Zr], a value of parameter A expressed by A=[Si]+2×[Zr] satisfies 1.4 to 2.5.

The flux-cored wire preferably has a flux percentage of 23 to 29 mass %.

In the flux-cored wire, preferably, the wire contains, relative to the total mass of the wire,
the Si: 0.5 to 1.1 mass %, and
the Zr: 0.3 to 0.7 mass %, and
the value of parameter A satisfies 1.4 to 2.3.

The flux-cored wire preferably further contains an alkali metal compound and a metal fluoride,
wherein, for the alkali metal compound, a total of a Na content in terms of $Na_2O$ and a K content in terms of $K_2O$ relative to the total mass of the wire is 0.1 to 3.0 mass %, and
for the metal fluoride, a content in terms of fluorine relative to the total mass of the wire is 0.01 to 0.50 mass %.

Advantageous Effects of Invention

The present invention can provide a flux-cored wire used for welding stainless steel and having high welding usability.

DESCRIPTION OF EMBODIMENTS

Hereinafter, embodiments according to the present invention will be described in detail. Note that the present invention is not limited to the following embodiments and can be appropriately modified and carried out without departing from the spirit and scope of the present invention.

[Flux-Cored Wire]

A flux-cored wire according to this embodiment is a flux-cored wire for arc welding, including a steel sheath filled with flux, and satisfying the following composition.

The wire contains, relative to the total mass of the wire,
Cr: 16.0 to 22.0 mass %,
Ni: 6.0 to 11.0 mass %,
Mn: 0.7 to 2.6 mass %, Si: 0.1 to 1.1 mass %,
Zr: 0.2 to 0.8 mass %,
Fe: 45.0 to 65.0 mass %,
$TiO_2$: 5.0 to 9.0 mass %,
$SiO_2$: 0.1 to 2.0 mass %, and
$ZrO_2$: 0.5 to 3.0 mass %, and
is restricted to Bi: less than 0.0020 mass % (including 0 mass %), and
when, by mass %, the Si content is denoted by [Si] and the Zr content is denoted by [Zr], the value of parameter A expressed by A=[Si]+2×[Zr] satisfies 1.4 to 2.5.

Note that the flux-cored wire is a wire including a steel sheath filled with flux. Note that the flux-cored wire may have a seamless-type form not having a seam in the sheath or a seam-type form having a seam in the sheath, such as a folded section. For the flux-cored wire, the wire surface (the outside of the sheath) may or may not be treated by, for example, plating with Cu or the like.

(Component Composition)

Hereinafter, contents of components of the flux-cored wire according to this embodiment will be described. Components for obtaining weld metal having predetermined properties may be added from the steel sheath or the filling flux. Thus, in the following descriptions unless otherwise specified, the content of each component of the flux-cored wire is defined as the total content of the component in the steel sheath and in the flux relative to the total mass of the wire.

The components described below are added, in various forms such as simple substances, compounds, or alloys, to the steel sheath or the flux. In this embodiment, the forms of the components added are not specified and the sources of the raw materials are not specified.

<Cr: 16.0 to 22.0 Mass %>

Cr has, as a ferrite stabilizer element, the role of adjusting the balance of the ferrite phase/austenite phase, and also has, as an element forming a passivation film, the action of improving the pitting corrosion resistance of the weld. The Cr content is set to 16.0 mass % or more, so that the action can be sufficiently provided. On the other hand, the Cr content is set to 22.0 mass % or less, so that precipitation of a σ phase being an intermetallic compound and the resultant degradation of the low-temperature toughness of the weld can be suppressed. Thus, the Cr content is defined as 16.0 to 22.0 mass %. The Cr content is preferably 17.5 mass % or more, more preferably 18.5 mass % or more. The Cr content is preferably 21.0 mass % or less, more preferably 20.0 mass % or less.

<Ni: 6.0 to 11.0 Mass %>

Ni has, as an austenite stabilizer element, the role of adjusting the balance of the ferrite phase/austenite phase, and is also an element that is effective for improving the low-temperature toughness of the weld. The Ni content is set to 6.0 mass % or more, so that such an effect can be sufficiently provided. On the other hand, the Ni content is set to 11.0 mass % or less, so that excessive formation of an austenite phase in the weld metal and the resultant decrease in the strength of the weld can be suppressed. Thus, the Ni content is defined as 6.0 to 11.0 mass %. The Ni content is preferably 7.5 mass % or more, more preferably 8.0 mass % or more. The Ni content is preferably 10.0 mass % or less, more preferably 9.0 mass % or less.

<Mn: 0.7 to 2.6 Mass %>

Mn has, as an austenite stabilizer element, the role of adjusting the balance of the ferrite phase/austenite phase, and also functions as a deoxidation element. The Mn content is set to 0.7 mass % or more, so that such an effect can be sufficiently provided. On the other hand, the Mn content is set to 2.6 mass % or less, so that degradation of the low-temperature toughness of the weld due to formation of MnS can be suppressed. Thus, the Mn content is defined as 0.7 to 2.6 mass %. The Mn content is preferably 1.0 mass % or more, more preferably 1.5 mass % or more. The Mn content is preferably 2.5 mass % or less.

<Si: 0.1 to 1.1 Mass %>

Si is added from, for example, the stainless steel sheath, metallic silicon, ferrosilicon, and ferrosilicon manganese, and has an effect of improving the bead shape or the slag coverage. The Si content is set to 0.1 mass % or more, so that an appropriate amount of slag is formed by the deoxidation reaction during welding, and a good bead shape is provided. On the other hand, the Si content is set to 1.1 mass % or less, so that low slag coverage due to an excessive amount of slag can be prevented. Thus, the Si content is defined as 0.1 to 1.1 mass %. The Si content is preferably 0.5 mass % or more, more preferably 0.7 mass % or more. The Si content is preferably 1.0 mass % or less, more preferably 0.9 mass % or less. Note that Si is metallic Si and its content means the total content of elemental Si and Si included in the alloy.

<Zr: 0.2 to 0.8 Mass %>

Zr is added from, for example, the stainless steel sheath, metallic Zr, and Fe—Zr—Si, is a strong deoxidation element, and has effects of increasing the toughness of the weld metal and improving the welding usability. For flux-cored wires for stainless steel, when the Bi content is less than 0.0020 mass %, the corrosion resistance is high, but the welding usability such as slag removability is insufficient in some cases. Thus, in the flux-cored wire according to this embodiment, metallic Zr is added to thereby improve the welding usability such as slag removability. The Zr content is set to 0.2 mass % or more, so that such an effect can be sufficiently provided. On the other hand, when the Zr content is set to 0.8 mass % or less, a decrease in the toughness due to an excessive strength caused by the precipitation effect can be suppressed and high slag removability can be provided. Thus, the Zr content is defined as 0.2 to 0.8 mass %. The Zr content is preferably 0.3 mass % or more, more preferably 0.4 mass % or more. The Zr content is preferably 0.7 mass % or less, more preferably 0.6 mass % or less. Note that Zr is metallic Zr and its content means the total content of elemental Zr and Zr included in the alloy.

<Bi: Less than 0.0020 Mass % (Including 0 Mass %)>

For Bi, when the weld is held at high temperature for a long time, Bi tends to concentrate in austenite grain boundaries and causes degradation of the cracking resistance. When the Bi content is 0.0020 mass % or more, the corrosion resistance degrades. Thus, the Bi content is restricted to less than 0.0020 mass %. The lower the Bi content, the more preferable it is; the Bi content is preferably less than 0.0005 mass %, or may be 0 mass % (no content).

$<$Parameter A=[Si]+2×[Zr]: 1.4 to 2.5$>$

The inventors of the present invention have found the following: when the contents of the components satisfy the above-described ranges, high low-temperature toughness and high welding usability can be achieved; however, in order to achieve higher low-temperature toughness and higher welding usability, in addition to the contents of the components, the relation between the Si content and the Zr content is also important. When the Si content is denoted by [Si] and the Zr content is denoted by [Zr], the value of parameter A expressed by A=[Si]+2×[Zr] is set to 1.4 or more, to thereby provide sufficiently such effects. The value of parameter A is set to 2.5 or less, to thereby suppress degradation of low-temperature toughness or degradation of slag removability due to excessive hardenability. Furthermore, from the viewpoint of making the vertical weld bead be flat, improving the slag removability, and providing a good weld bead in execution of fixed-pipe welding, the value of parameter A is preferably 1.5 or more, more preferably 1.7 or more, still more preferably 1.9 or more. The value of parameter A is preferably 2.3 or less, more preferably 2.1 or less.

<$TiO_2$: 5.0 to 9.0 Mass %>

$TiO_2$ is the main component of a slag forming agent, has the action of improving the slag coverage over the weld metal to make the bead shape better, and also provides the effect of accelerating solidification of slag to improve the welding usability of vertical or overhead welding. In addition, a predetermined $TiO_2$ content provides the effect of stabilizing the arc. The $TiO_2$ content is set to 5.0 mass % or more, so that such actions can be sufficiently provided and high welding usability is provided. On the other hand, the $TiO_2$ content is set to 9.0 mass % or less, so that degradation of the removability due to hardening of slag during welding is suppressed, and degradation of the porosity-defect resistance is suppressed. Thus, the $TiO_2$ content is defined as 5.0 to 9.0 mass %. The $TiO_2$ content is preferably 6.0 mass % or more, more preferably 6.5 mass % or more. The $TiO_2$ content is preferably 8.0 mass % or less, more preferably 7.5 mass % or less. Note that $TiO_2$ means the Ti compound value in terms of $TiO_2$.

<$SiO_2$: 0.1 to 2.0 Mass %>

$SiO_2$ has the action of improving the slag coverage over the weld metal to make the bead shape better, and also has the effect of improving the bead wettability. The $SiO_2$ content is set to 0.1 mass % or more, so that such actions can be sufficiently provided and high welding usability can be provided. On the other hand, the $SiO_2$ content is set to 2.0 mass % or less, so that considerable degradation of the removability due to hardening of slag can be suppressed. Thus, the $SiO_2$ content is defined as 0.1 to 2.0 mass %. The $SiO_2$ content is preferably 0.5 mass % or more, more preferably 0.8 mass % or more. The $SiO_2$ content is preferably 1.5 mass % or less, more preferably 1.2 mass % or less. Note that $SiO_2$ means the Si compound value in terms of $SiO_2$, and is clearly distinguished from metallic Si.

<$ZrO_2$: 0.5 to 3.0 Mass %>

$ZrO_2$ has the effect of accelerating solidification of slag to improve the welding usability of vertical or overhead welding. The $ZrO_2$ content is set to 0.5 mass % or more, so that such an action can be sufficiently provided and high welding usability can be provided. On the other hand, the $ZrO_2$ content is set to 3.0 mass % or less, so that degradation of the slag removability can be suppressed. Thus, the $ZrO_2$ content is defined as 0.5 to 3.0 mass %. The $ZrO_2$ content is preferably 1.0 mass % or more, more preferably 1.5 mass % or more. The $ZrO_2$ content is preferably 2.6 mass % or less, more preferably 2.1 mass % or less. Note that $ZrO_2$ means the Zr compound value in terms of $ZrO_2$, and is clearly distinguished from metallic Zr.

<Alkali Metal Compounds, Total of Na Value in Terms of $Na_2O$ and K Value in Terms of $K_2O$: 0.1 to 3.0 Mass %>

Alkali metal compounds that are a Na compound and a K compound have the effect of stabilizing the arc to reduce the amount of spatters generated. When the alkali metal compounds, which are not necessarily contained, are contained, the total of the Na value in terms of $Na_2O$ and the K value in terms of $K_2O$ can be set to 0.1 mass % or more, to thereby provide sufficiently such an action. On the other hand, the total of the Na value in terms of $Na_2O$ and the K value in terms of $K_2O$ can be set to 3.0 mass % or less, so that a bead shape failure due to accelerated solidification of slag can be suppressed. Thus, the total of the Na value in terms of $Na_2O$ and the K value in terms of $K_2O$ is preferably 0.1 mass % or more, more preferably 0.5 mass % or more, still more preferably 1.0 mass % or more. The total of the Na value in terms of $Na_2O$ and the K value in terms of $K_2O$ is preferably 3.0 mass % or less, more preferably 2.5 mass % or less, still more preferably 2.0 mass % or less.

The Na content in terms of $Na_2O$ is preferably 0.1 mass % or more, more preferably 0.3 mass % or more, still more preferably 0.5 mass % or more. The Na content in terms of $Na_2O$ is preferably 3.0 mass % or less, more preferably 1.5 mass % or less, still more preferably 1.0 mass % or less.

The K content in terms of $K_2O$ is preferably 0.1 mass % or more, more preferably 0.3 mass % or more, still more preferably 0.5 mass % or more. The K content in terms of $K_2O$ is preferably 3.0 mass % or less, more preferably 1.5 mass % or less, still more preferably 1.0 mass % or less.

<Metal Fluoride, Value in Terms of Fluorine: 0.01 to 0.50 Mass %>

The metal fluoride has the action of adjusting the fluidity of slag and also improves the slag removability. It also has the action of suppressing porosity defects such as pits and blowholes. When the metal fluoride, which is not necessarily contained, is contained, the metal fluoride content in terms of fluorine can be set to 0.01 mass % or more, so that the actions can be sufficiently provided, and high welding usability can be provided. On the other hand, even when the content in terms of fluorine is set to more than 0.50 mass %, the effect of further improving the slag removability or further improving the porosity-defect resistance is not provided. When the content in terms of fluorine is set to 0.50 mass % or less, excessive fluidity of slag is suppressed to facilitate vertical or overhead welding, and also an excessive amount of fume generated is prevented to provide high arc stability. Thus, the metal fluoride content in terms of fluorine is preferably 0.01 mass % or more, more preferably 0.10 mass % or more, still more preferably 0.15 mass % or more. The metal fluoride content in terms of fluorine is preferably 0.50 mass % or less, more preferably 0.35 mass % or less, still more preferably 0.25 mass % or less.

Note that examples of components that can be included as the metal fluoride include $CaF_2$, $BaF_2$, $MgF_2$, LiF, NaF, and KF. In particular, from the viewpoint of improving the arc stability, NaF or KF is preferably contained.

<Fe: 45.0 to 65.0 Mass %>

Fe is the main component of the flux-cored wire. From the viewpoint of quantity of weld deposition or the other component composition, the Fe content is 45.0 mass % or more, preferably 50.0 mass % or more, more preferably 55.0 mass % or more. The Fe content is 65.0 mass % or less, preferably 62.0 mass % or less, more preferably 60.0 mass % or less.

In the flux-cored wire according to this embodiment, the total content of the above-described Cr, Ni, Mn, Si, Zr, Fe, $TiO_2$, $SiO_2$, $ZrO_2$, and Bi is preferably 85 mass % or more, more preferably 88 mass % or more, still more preferably 92 mass % or more, particularly preferably 95 mass % or more.

<Other Components>

The flux-cored wire according to this embodiment includes unavoidable impurities. It may contain, as another component, as needed, Al≤0.010 mass %, Ta≤0.010 mass %, W≤0.010 mass %, Sn≤0.010 mass %, Mg≤0.010 mass %, or rare earth element (REM) 0.010 mass %, for example. Such components may be positively added as long as advantages of the present invention are not impaired.

(Flux Percentage: 23 to 29 Mass %)

The flux percentage of the flux-cored wire is a value expressed by Mass of flux/Total mass of wire×100(%).

The flux percentage is not particularly limited; however, when the flux-cored wire according to this embodiment is used for SUS304 stainless steel materials, from the viewpoint of ensuring mechanical properties in the weld metal, the flux percentage is preferably 23 mass % or more, more preferably 24 mass % or more, still more preferably 25 mass % or more. From the viewpoint of ensuring the welding usability, the flux percentage is preferably 29 mass % or less, more preferably 28 mass % or less, still more preferably 27 mass % or less.

[Method for Producing Flux-Cored Wire]

The flux-cored wire according to this embodiment is not particularly limited in terms of the production method, but can be produced by, for example, the following method.

First, a steel strip for constituting the steel sheath is prepared; while this steel strip is fed in the longitudinal direction, it is shaped using forming rolls into a U-shaped open pipe. Subsequently, a flux prepared by mixing various raw materials so as to satisfy a predetermined component composition is filled into the steel sheath, and subsequently the steel sheath is processed such that its section becomes circular. Subsequently, it is drawn by cold working to provide a flux-cored wire having the desired wire diameter.

The wire diameter is not particularly limited, but is, for example, 1.2 mm to 1.6 mm.

Note that, during cold working, annealing may be performed. The structure of a seamless wire in which the edges at the seam of the steel sheath provided by shaping during production are welded together, or the structure of a wire in which the edges at the seam are not welded together and are left to have the gap can be employed.

EXAMPLES

Hereinafter, the present invention will be described in detail with reference to Examples and Comparative Examples; however, the present invention is not limited to these.

A flux prepared by appropriately mixing raw materials was filled into a steel sheath such that the flux percentage relative to the total mass of the wire became 26 mass %, to produce a flux-cored wire having a wire diameter of 1.2 mm.

Table 1 below describes contents (mass %) of chemical components of flux-cored wires in Examples and Comparative Examples. In Table 1, Metal fluoride means the metal fluoride content in terms of fluorine, and Alkali metal compound means the total of the Na content in terms of $Na_2O$ and the K content in terms of $K_2O$.

TABLE 1

| | Fe | Cr | Ni | Mn | Si | Zr | Bi | $TiO_2$ | $SiO_2$ | $ZrO_2$ | Metal fluoride | Alkali metal compound | Parameter A [Si] + 2[Zr] |
|---|---|---|---|---|---|---|---|---|---|---|---|---|---|
| Example 1 | 57.9 | 17.9 | 8.4 | 2.5 | 0.9 | 0.4 | <0.0005 | 6.9 | 0.9 | 2.1 | 0.18 | 1.9 | 1.7 |
| Example 2 | 56.6 | 18.9 | 8.4 | 2.5 | 1.1 | 0.6 | <0.0005 | 6.9 | 0.9 | 2.1 | 0.18 | 1.8 | 2.3 |
| Example 3 | 56.8 | 18.9 | 8.4 | 2.5 | 1.0 | 0.5 | <0.0005 | 6.9 | 0.9 | 2.1 | 0.18 | 1.8 | 2.0 |
| Example 4 | 58.8 | 17.9 | 8.2 | 2.5 | 0.8 | 0.4 | <0.0005 | 6.6 | 0.8 | 2.1 | 0.15 | 1.8 | 1.6 |
| Comparative Example 1 | 57.6 | 18.8 | 8.0 | 2.5 | 0.3 | — | <0.0005 | 7.2 | 1.5 | 2.4 | 0.22 | 1.5 | 0.3 |
| Comparative Example 2 | 57.3 | 18.5 | 8.4 | 2.5 | 0.3 | — | <0.0005 | 8.8 | 0.9 | 2.1 | 0.18 | 1.0 | 0.3 |
| Comparative Example 3 | 57.3 | 18.9 | 8.4 | 2.5 | 0.7 | 0.3 | <0.0005 | 6.9 | 0.9 | 2.1 | 0.18 | 1.8 | 1.3 |

The obtained flux-cored wires were used, with, as parent materials, steel sheets having a composition described in Table 2, to perform horizontal fillet weld and vertical-up fillet weld under test conditions described in Table 3, during which evaluations of welding usability were performed. Note that the composition in Table 2 describes main chemical components other than Fe.

The evaluation methods of welding usability are as follows and the evaluation results will be described in Table 4.

The evaluation grades of arc stability are as follows and Good and Average are pass grades.

Good: the arc was very stable.
Average: the arc was relatively stable.
Poor: the arc was unstable.

The evaluation grades of the amount of spatters are as follows and Good and Average are pass grades.

Good: the amount of spatters was very small.
Average: the amount of spatters was relatively small.
Poor: the amount of spatters was large.

The evaluation grades of the amount of fume are as follows and Good and Average are pass grades.

Good: the amount of fume was very small.
Average: the amount of fume was relatively small.
Poor: the amount of fume was large.

The bead appearance was evaluated by visually inspecting the weld metal. The evaluation grades are as follows and Good and Average are pass grades.

Good: the bead appearance was good.
Average: the bead appearance was relatively good.
Poor: the bead appearance was poor.

The bead shape was evaluated by visually inspecting the weld metal. The evaluation grades are as follows and Good and Average are pass grades.

Good: the bead shape was good.
Average: the bead shape was relatively good.
Poor: the bead shape was poor.

The evaluation grades of slag removability are as follows and Good and Average are pass grades.

Good: the slag removability was high.
Average: the slag removability was relatively high.
Poor: the slag removability was low.

The wettability and uniformity were evaluated by visually inspecting the weld metal. The evaluation grades are as follows and Good and Average are pass grades.

Good: the wettability and uniformity were high.
Average: the wettability and uniformity were relatively high.
Poor: the wettability and uniformity were low.

TABLE 2

| Parent material | Sheet thickness (mm) | Chemical components (mass %) | | | | | | | |
|---|---|---|---|---|---|---|---|---|---|
| | | C | Si | Mn | P | S | Ni | Cr | Mo |
| SUS304 | 20 | 0.05 | 0.48 | 0.96 | 0.035 | 0.005 | 8.50 | 18.64 | 0.3 |

TABLE 3

| | |
|---|---|
| Parent material | JIS G 4304 (2015) SUS304, Sheet thickness: 9 mm |
| Groove shape | T-joint fillet weld |
| Wire | Flux wire having components described in Table 1 (wire diameter (diameter): 1.2 mm) |
| Shielding gas | 80%Ar—20%$CO_2$, flow rate = 25 l/min |
| Welding position | (1) horizontal fillet (2) vertical-up fillet |
| Welding conditions | (1) horizontal fillet: 200 A-28 V-30 to 50 cm/min (2) vertical-up fillet: 150 A-24 V-10 to 15 cm/min |
| Number of lamination layers | single layer, single run (both-side welding) |
| Preheating temperature | room temperature to 100° C. |

TABLE 4

| | Arc stability | Amount of spatters | Amount of fume | Bead appearance | Bead shape | Slag removability | Wettability and uniformity |
|---|---|---|---|---|---|---|---|
| Horizontal fillet weld | | | | | | | |
| Example 1 | Good | Good | Good | Good | Good | Good | Good |
| Example 2 | Good | Good | Good | Good | Good | Good | Good |
| Example 3 | Good | Good | Good | Good | Good | Good | Good |
| Example 4 | Good | Good | Good | Good | Good | Good | Good |
| Comparative Example 1 | Good | Good | Good | Good | Good | Poor | Good |
| Comparative Example 2 | Good | Good | Good | Good | Good | Average | Good |
| Comparative Example 3 | Good | Good | Good | Good | Good | Good | Good |
| Vertical-up fillet weld | | | | | | | |
| Example 1 | Average | Average | Good | Good | Good | Good | Good |
| Example 2 | Average | Average | Good | Good | Good | Good | Good |
| Example 3 | Average | Average | Good | Good | Good | Good | Good |
| Example 4 | Average | Average | Good | Good | Good | Good | Good |
| Comparative Example 1 | Good | Good | Good | Poor | Poor | Poor | Good |
| Comparative Example 2 | Good | Good | Good | Average | Poor | Average | Good |
| Comparative Example 3 | Average | Average | Good | Good | Poor | Good | Good |

The above-described results have demonstrated that, in both of horizontal fillet weld and vertical-up fillet weld, compared with Comparative Examples 1 and 2 not containing Zr, Examples 1 to 4 each provided the result of high slag removability. In vertical-up fillet weld, the results of good bead appearance and good bead shape were also provided.

For Comparative Example 3 in which the predetermined Zr and Si contents are satisfied, but the value of parameter A expressed by [Si]+2×[Zr] is less than 1.4, in vertical-up fillet weld, the bead shape was poor; by contrast, in each of Examples 1 to 4, the bead shape was good.

The obtained flux-cored wires were used to perform flat welding under test conditions described in Table 5; the resultant weld metals were subjected to, as evaluations of mechanical properties, tests in terms of 0.2% proof stress, tensile strength, and thermal stress.

The evaluation methods of the mechanical properties are as follows and the evaluation results will be described in Table 6.

For 0.2% proof stress and tensile strength, tensile test specimens were prepared by all-weld metal welding under conditions described in Table 5, and were tested in accordance with AWS A5.22: 2012. For 0.2% proof stress, a case of 350 MPa or more and less than 400 MPa was evaluated as good, and a case of 400 MPa or more was evaluated as very good. For the tensile test, a case of 550 MPa or more and less than 600 MPa was evaluated as good, and a case of 600 MPa or more was evaluated as very good.

The Charpy impact value was measured by performing all-weld metal welding under conditions described in Table 5 to prepare V-notch test specimens and by performing the test at 0° C. The vE values at 0° C. were all 47 J or more and good.

TABLE 5

| | |
|---|---|
| Parent material | JIS G 4304 (2015) SUS304 Sheet thickness: 20 mm (chemical components are described in Table 2) |
| Groove shape | 45° V groove, root gap = 10 mm, root face = 0 mm |
| Wire | Flux-cored wire having components described in Table 1 (wire diameter (diameter): 1.2 mm) |
| Shielding gas | 100%$CO_2$, flow rate = 25 l/min |
| Welding position | flat |
| Welding conditions | current and voltage: 190 to 210 A, 28 to 30 V speed = 20 to 35 cm/min, energy input per unit length = 0.8 to 2.0 kJ/mm |
| Polarity | DCEP |
| Number of lamination layers | 6 layers, 12 runs |
| Preheating temperature | room temperature |
| Interpass temperature | Max. 150° C. |

TABLE 6

| | Mechanical properties | | |
|---|---|---|---|
| | 0.2% proof stress (MPa) | Tensile strength (MPa) | vE (0° C.) (J) |
| Example 1 | 420 | 624 | 69 |
| Example 2 | 376 | 603 | 72 |
| Example 3 | 413 | 603 | 82 |
| Example 4 | 411 | 607 | 69 |
| Comparative Example 1 | 371 | 565 | 74 |
| Comparative Example 2 | 414 | 602 | 79 |
| Comparative Example 3 | 370 | 560 | 71 |

The above-described results have demonstrated that, for the flux-cored wires of Examples 1 to 4, the resultant weld metals satisfy mechanical properties in demand, and very high welding usability is also provided.

Although the various embodiments have been described so far with reference to the drawings, the present invention is clearly not limited to such examples. Those skilled in the art would clearly conceive, within the scope described in CLAIMS, various modifications or variations, and it is appreciated that these also naturally belong to the technical scope of the present invention. Without departing from the spirit and scope of the invention, features in the above-described embodiments may be appropriately combined together.

Note that the present application is based on a patent application (JP2020-150048) filed in the Japan Patent Office on Sep. 7, 2020, and the contents of which are incorporated herein by reference.

The invention claimed is:

1. A flux-cored wire for arc welding, comprising a steel sheath filled with flux,
    wherein the wire contains, relative to a total mass of the wire,
    Cr: 16.0 to 22.0 mass %,
    Ni: 6.0 to 11.0 mass %,
    Mn: 0.7 to 2.6 mass %,
    Si: 0.1 to 1.1 mass %,
    Zr: 0.2 to 0.8 mass %,
    Fe: 45.0 to 65.0 mass %,
    $TiO_2$: 5.0 to 9.0 mass %,
    $SiO_2$: 0.1 to 2.0 mass %,
    $ZrO_2$: 0.5 to 3.0 mass %, and
    Bi: less than 0.0020 mass % and
    wherein, by mass %, a Si content is denoted by [Si] and a Zr content is denoted by [Zr], a value of parameter A expressed by A=[Si]+2×[Zr] satisfies 1.4 to 2.5.

2. The flux-cored wire according to claim 1, having a flux percentage of 23 to 29 mass %.

3. The flux-cored wire according to claim 1, wherein the wire contains, relative to the total mass of the wire,
    Si: 0.5 to 1.1 mass %, and
    Zr: 0.3 to 0.7 mass %, and
    wherein the value of parameter A satisfies 1.4 to 2.3.

4. The flux-cored wire according to claim 1, further containing an alkali metal compound and a metal fluoride,
    wherein, for the alkali metal compound, a total of a Na content in terms of $Na_2O$ and a K content in terms of $K_2O$ relative to the total mass of the wire is 0.1 to 3.0 mass %, and
    for the metal fluoride, a content in terms of fluorine relative to the total mass of the wire is 0.01 to 0.50 mass %.

5. The flux-cored wire according to claim 3, further containing an alkali metal compound and a metal fluoride,
    wherein, for the alkali metal compound, a total of a Na content in terms of $Na_2O$ and a K content in terms of $K_2O$ relative to the total mass of the wire is 0.1 to 3.0 mass %, and
    for the metal fluoride, a content in terms of fluorine relative to the total mass of the wire is 0.01 to 0.50 mass %.

* * * * *